Feb. 8, 1938.  J. C. ADAMS  2,107,923
COFFEE MAKER
Original Filed Oct. 4, 1933
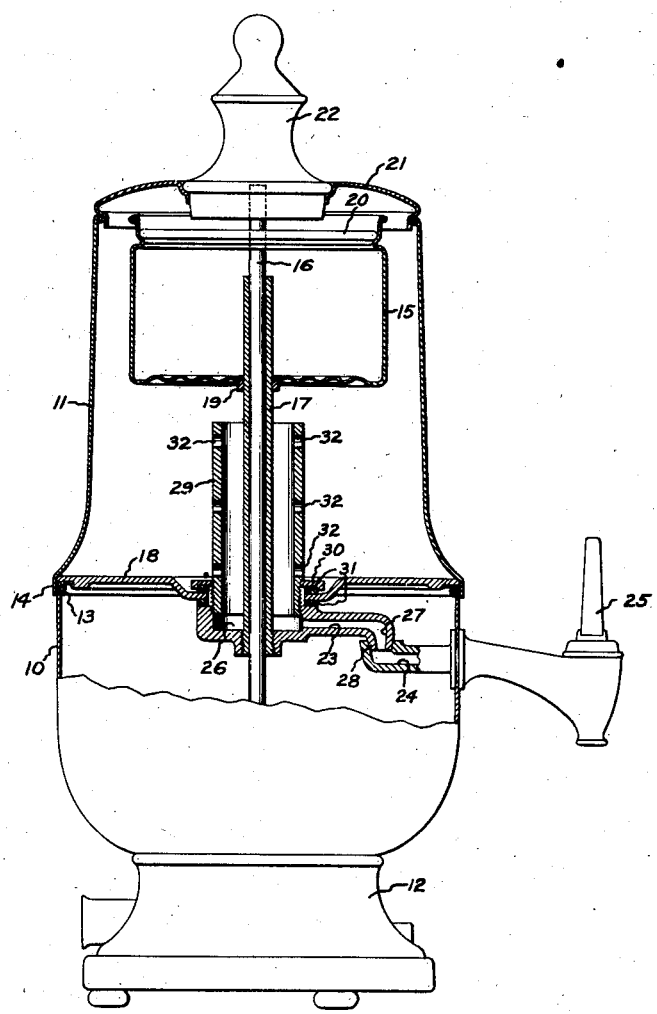
Inventor:
Joy C. Adams,
by Harry E. Dunham
His Attorney.

Patented Feb. 8, 1938

2,107,923

UNITED STATES PATENT OFFICE 2,107,923

COFFEE MAKER

Joy C. Adams, Bridgeport, Conn., assignor to General Electric Company, a corporation of New York Original application October 4, 1933, Serial No. 692,097. Divided and this application November 15, 1935, Serial No. 49,896

5 Claims. (Cl. 53—3)

This invention relates to coffee makers, more particularly to coffee makers of the "drip" type wherein the heated water passes but once through the coffee grounds, and it has for its object the provision of an improved device of this character.

This application is a division of my copending application, Serial No. 692,097, filed October 4, 1933, and is assigned to the same assignee as this copending application.

In making coffee by the drip method the hot water which first passes through the coffee grounds extracts more coffee essence or flavor than the hot water that is subsequently passed through the grounds. The coffee infusion which is first made is, therefore, much stronger than the rest. As a result, the coffee infusion collects in layers or strata of different strength in the infusion chamber, the coffee in the lower strata being much stronger than that in the higher. Consequently, the first cup or so of coffee withdrawn from the infusion chamber is considerably stronger than those withdrawn later.

This invention contemplates the provision of suitable means for automatically mixing the coffee from the various layers so that the first cup of coffee withdrawn will be no stronger than the rest.

For a more complete understanding of my invention, reference should be had to the accompanying drawing in which the single figure is a vertical elevation of a coffee maker arranged in accordance with my invention, parts being shown in section so as to illustrate certain details of construction.

Referring to the drawing, I have shown my invention in one form as applied to a coffee maker of the "drip" type comprising a water container or receptacle 10 and a coffee infusion receptacle 11 placed above it. The water receptacle 10 is mounted upon a suitable base 12. The upper end of the water receptacle 10 is open, and its upper edge 13 is arranged to support the infusion receptacle 11. As shown, the infusion receptacle 11 is provided with a peripheral downwardly extending flange 14 which is arranged to fit tightly about the upper outer edge portion of the water receptacle so as to retain the infusion receptacle in its proper position upon the water receptacle. A suitable ground coffee container 15 is supported in the upper portion of the infusion chamber 11.

As pointed out in detail in my above mentioned copending application, the water in the water container 10 is heated and transferred by percolator action up to the infusion chamber 11 where it is caused to percolate through the ground coffee in the container 15 to the lower portion of the infusion chamber 11. As shown, a suitable percolator fountain tube 16 is provided to convey the water from the heating chamber to a point in the infusion chamber somewhat above the ground coffee container 15 so that the water which issues from the tube will fall directly into the coffee container.

The infusion chamber 11 preferably will be provided with a centrally arranged vertical tube 17 adapted to slide over the fountain tube 16 so as to stabilize the position of the infusion chamber. The metallic tube 17, as shown, is threaded into the bottom wall 18 of the infusion chamber. The tubular member 17 also functions to support the ground coffee container 15. For this purpose, the tubular member is provided with a collar or abutment 19 on which the ground coffee container rests.

It will be understood, of course, that the coffee container 15 will be covered by means of a suitable water distributing screen 20 in the usual manner. It will also be understood that the infusion chamber 11 will be provided with a suitable cover 21 which supports centrally thereof a glass cover member 22 arranged to spread the water which issues from the fountain tube 16 over the spreading screen 20 in a manner well understood by those skilled in the art.

The coffee infusion in the chamber 11 is drawn off through a discharge conduit 23 which communicates with a passageway 24 rigidly secured in the receptacle 10, and which in turn communicates with a suitable faucet 25. The conduit 23 communicates with the infusion chamber 11 by means of a discharge sump 26 arranged below and centrally of the bottom of the infusion chamber. The conduit 23 at its discharge end is provided with a downwardly depending nozzle 27 which is arranged to be received in an upturned socket 28 provided for it in the conduit 24. By reason of this arrangement, it will be observed that when the infusion chamber 11 is placed upon the water container 10, the nozzle 27 will be received in the socket 28 so as to effect a water-tight connection between the conduits 23 and 24.

I have provided suitable means for mixing the several layers of the infusion so that the first cup of coffee withdrawn will be no stronger than the rest. For this purpose, I have provided an upright conduit 29 centrally of the infusion chamber. This conduit communicates at its lower end with the discharge sump 26; as shown, the conduit 29 has a threaded connection with the sump. The conduit, as shown, projects upwardly through the bottom wall 18, and directly above the bottom wall has a collar 30 threaded upon it so that the bottom wall is sandwiched between the collar and the sump. Suitable gaskets 31 are provided between the collar 30 and the bottom wall 18 and between the bottom wall and the sump, as clearly shown in the figure, so as to effect a liquid-tight connection between the sump 26 and conduit 29 and the bottom wall 18.

The conduit 29 is provided with a plurality of apertures 32 arranged at different levels of the infusion chamber so that coffee infusion is supplied to the conduit and hence to the sump from several different liquid levels in the infusion chamber. Thus, when the faucet 25 is opened so as to allow coffee infusion to flow from the chamber 11, the infusion of the several levels are mixed together in the conduit 29. The first cup of coffee withdrawn, therefore, will be formed of infusion of different degrees of strength, some of it coming from the stronger bottom layers, some from weaker intermediate layers and some from the weakest layers at the top. Likewise, the second cup will be filled with coffee from substantially the same liquid layers of the infusion chamber. In this manner, all of the cups will be filled with infusion of substantially the same strength.

It will be observed that I have provided suitable means for withdrawing coffee infusion from various layers in the infusion chamber, thereby insuring that the coffee in successive cups will have substantially the same strength.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A coffee maker comprising an infusion receptacle, a ground coffee receptacle in the upper portion of said infusion receptacle, means for supplying heated water to said coffee receptacle through which it gravitates to said infusion receptacle where it collects in strata of varying strength from the lower to the upper levels of the collected infusion, a discharge conduit, a faucet controlling said discharge conduit, a vertical conduit within said receptacle connected at its lower end to said discharge conduit and having a plurality of apertures arranged at spaced intervals from said lower to said upper levels so that infusion of varying strength at the different levels of the collected infusion can flow simultaneously into said vertical conduit, when the faucet is opened so that the infusion from the different levels is mixed in the conduit and discharged from the faucet.

2. A drip coffee maker comprising a ground coffee container, a receptacle arranged to receive coffee infusion made by passing heated water through said coffee container, the infusion collecting in said container in strata of decreasing strength from the lower strata to the upper, a vertically arranged discharge conduit extending substantially from said lower to said upper strata and means for delivering simultaneously to said discharge conduit coffee infusion from preselected levels ranging substantially from the lower to the upper of said strata.

3. A drip coffee maker comprising a water container and a coffee infusion receptacle detachably mounted on said water container, said infusion receptacle having a discharge sump in its bottom wall, a discharge conduit extending upwardly a material distance into said infusion receptacle substantially from the lower to the upper infusion level and having a plurality of apertures through its walls spaced at intervals substantially from the bottom to the top of said conduit, means connecting the lower end of said conduit with said sump, a discharge faucet and means connecting said sump with said faucet, the coffee infusion in said infusion receptacle flowing into said discharge conduit when the faucet is open from said lower to said upper level so as to mix the coffee brew of different strengths from different levels.

4. A drip coffee maker comprising a water container and a coffee infusion receptacle detachably mounted on said water container, said infusion receptacle having a discharge sump below its bottom wall, a discharge conduit extending upwardly into said infusion receptacle through said bottom wall, said conduit having a plurality of apertures through its walls positioned at different levels and having its lower end connected with said sump, a discharge conduit rigidly secured to said sump, a discharge conduit rigidly secured to the walls of said water receptacle, a discharge faucet controlling said latter conduit, means for establishing liquid communication between said discharge conduits when said infusion receptacle is placed in its operative position on said water receptacle, and the coffee infusion in said infusion receptacle flowing into said discharge conduit from said different levels when the faucet is opened so as to mix the coffee brew of different strengths from the different levels.

5. A coffee maker comprising an infusion receptacle, a ground coffee receptacle in said infusion receptacle, means for supplying heated water to said coffee receptacle through which it gravitates to said infusion receptacle where it collects in strata of varying strength from the lower to the upper levels of the collected infusion, a discharge conduit, means controlling the discharge of coffee brew from said conduit, a vertical conduit within said receptacle connected at its lower end to said discharge conduit and having a plurality of apertures at spaced intervals from said lower to said upper level so that infusion of varying strength at the different levels of the collected infusion can flow into and mix in said vertical conduit when the brew is discharged from said discharge conduit.

JOY C. ADAMS.